Wilmans & Wolfe,
Bread Machine,
Nº 78,778. Patented June 9, 1868.

Witnesses:
J. Eric Bowen
W. B. Deming

Inventor;
C. J. Wilmans
W. J. Wolfe
By Knight Bros
Atty.

United States Patent Office.

CHARLES I. WILMANS AND WESLEY J. WOLFE, OF OLNEY, ILLINOIS.

Letters Patent No. 78,778, dated June 9, 1868.

IMPROVED DOUGH-KNEADER.

The Schedule referred to in these Letters Patent and making part of the same.

TO ALL WHOM IT MAY CONCERN:

Be it known that we, CHARLES I. WILMANS and WESLEY J. WOLFE, both of Olney, in the county of Richland, and State of Illinois, have invented certain new and useful Improvements in Dough-Kneaders; and we do hereby declare that the following is a sufficiently full, clear, and exact description thereof, to enable one skilled in the art to which our said invention appertains to make and use it, reference being had to the accompanying drawings, which form a part of this specification.

The subject of our invention is a machine for kneading and rolling dough for bread, crackers, &c., designed for family use and light manufacturing. It consists of a box, of suitable form and dimensions, mounted on legs, and divided into three or more compartments intended respectively to contain the flour, &c., to confine the dough in for rising, and for the kneading and rolling-apparatus. The two latter compartments are separated by a removable partition, the withdrawal of which turns the two into one to treat a greater quantity of dough at one operation. These two chambers have also a common curved bottom, preferably of metal, to adapt them to the movement of the kneader. The kneading-apparatus consists of a pivoted kneader, and a removable kneading-board having either plane or suitably roughened opposing surfaces, and a pair of adjustable rolls for rolling out the dough at any desired thickness for crackers, cakes, pastry, &c. The machine has a removable sectional cover, which, when the machine is in use, forms, in connection with an extensible frame mounted beneath the box, a table for the reception of the dough from the roller. In the drawings—

A may represent the box, B B' its supporting-legs, and C D E the three compartments into which its interior is divided; F G being the dividing partitions, the former of which is inserted in grooves $a$ in the sides of the box, to render it removable, as before described. H represents the bottom of the compartments C and D, and I that of the compartment E. K is the cover of the latter compartment, by means of which said compartment is separately closed to protect its contained flour from dirt, &c., while the machine is being used. L L' is the sectional cover of the box A; the part L being removably hinged to said box by means of staples $l$ and hooks $d^x$, and the part L' held in place by its juncture with L, and by a cleat, $l'$, on its under side, at its opposite or rear end. I also, however, propose providing them with marginal ribs or cleats to prevent the escape from them of flour, &c., when they are employed as a chute and table for the rolled dough, as will be hereinafter described, which will also serve to hold them in place as covers. M is the curved bar or lever of the kneader, and N its pivotal rock-shaft, said shaft being pivoted in the bearings $a^1$, and secured from displacement in said bearings by the hooks O, which rest in the circumferential grooves $u$ in its ends, the object of said attachment being to facilitate its removal to cleanse the compartment. $m$ is the handle of said lever M, and P its head or face-piece, for the attachment of which latter its lower end is bifurcated at $m'$. P' is the kneading-board, which, with the kneader P, we prefer to construct with suitable protuberances, ribs, or corrugations $p$, as represented in figs. 1, 2, 4, 5, 6, and 7, but which may also be plane. The kneading-board is removably held at an angle of about forty-five degrees in the compartment C by grooves $a^2$ in its sides, it being also capable of insertion in other grooves $a^3$, as shown in blue in fig. 2, to form an inclined throat to direct the dough into the opening between the rolls Q Q'. These rolls are pivoted in the bearing-plate $a^4$, and the upper one, Q, is rendered adjustable by means of the elongated slots $a^5$ and set-screws R R to set the rolls a greater or less distance apart. They are connected by the cog-wheels S S, and operated by the crank T, which latter is on the shaft of the upper roll Q. U is the removable door of the opening provided for the egress of the rolled dough. V V are stationary ways, mounted between the legs B B, and under the compartments C D of the box, and W a sliding frame supported in said ways, which, when in the position represeted in fig. 1, and in red outline in fig. 2, forms the support of the removed cover L', which is turned and placed on it to receive the dough as it comes from the roller. The other cover, L, being supported at one end by the hooks X X, and its lower end resting on L', forms a chute or inclined surface for the dough to slide down on.

Figure 3:
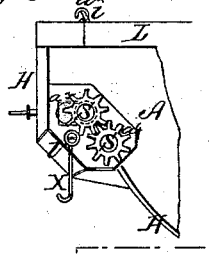
Figure 3 is an elevation of a portion of the front end of the machine.
Figure 2:
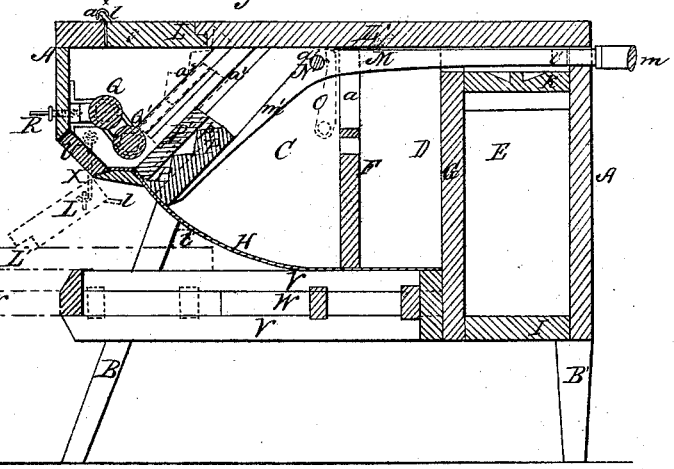
Figure 2 is a longitudinal section of the same closed, the relative positions of the movable parts when the machine is in use being indicated by red lines.
Figure 1:
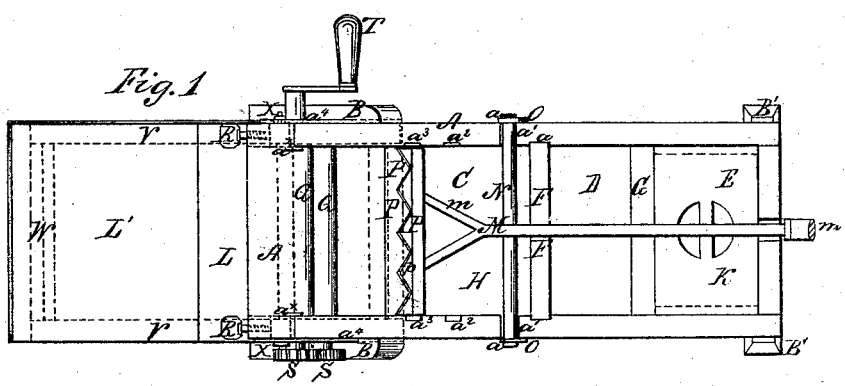
Figure 1 is a plan view of our invention with the several parts disposed for operation.
Figure 4:
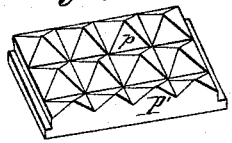
Figures 4 to 7 represent different forms for the kneader and kneading-board.
Figure 6:
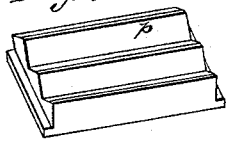
Figure 7:
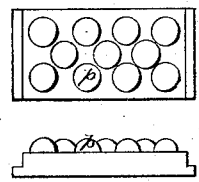
Figure 5:
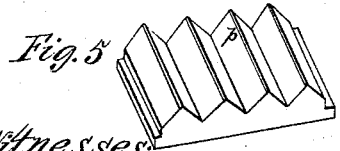
Figure 8:
Figure 8, a convenient form of sieve or dredging-box for sprinkling the surfaces with which the dough comes in contact, with flour.

The operation of the machine is as follows: The several parts of the machine being in the position represented in fig. 1 and in red outline in fig. 2, the parts with which the dough will come in contact are first sprinkled with flour, a convenient form of sieve for which is represented in fig. 8. The dough is then placed in the chamber C or C D in front of the kneader P, and a reciprocating motion imparted to the handle $m$ by the operator, its downward movement pressing the dough against the kneading-board P', and its upward movement withdrawing the kneader, and allowing the weight of the dough to return it to its former position. The operation is continued until the dough is sufficiently kneaded, when it may be taken out on the table L, or some other place, and divided into loaves. If it is desired to roll the dough, the door V is removed, and the kneading-board P' withdrawn, turned, and inserted in the grooves $a^3$, when, by forcing down the handle $m$, the kneader will press the dough into the opening between the rolls Q Q', which, by being revolved by means of the handle T, draw out the dough at the desired thickness, for which they have been previously set by the set-screws R; the rolled dough sliding down on the incline L on to the table L', on which it may be cut up, or be removed from it to a more convenient place. When the operation is finished, the door U and covers L L' are replaced, and the frame W slid in, as shown in fig. 2, when the machine will present a neat appearance, and its working parts be perfectly protected from dust, &c.

Having thus described our invention, the following is what we claim as new therein, and desire to secure by Letters Patent.

1. We claim the combination of the pivoted kneader M $m$ P, the stationary kneading-board P', and curved bottom H, all constructed, arranged, and operating as described, for the purpose specified.

2. The adjustable roller Q Q', arranged and operating in combination with the kneader P, substantially as specified.

3. The removable covers L L', in combination with the sliding frame W and hooks X, substantially as and for the purpose set forth.

4. The removable kneading-board P', in combination with the grooves $a^3$, roller Q Q', and kneader M P, for the purpose set forth.

5. The relative arrangement of the compartments C D E, removable partition F, stationary partition G, bottom H I, and cover K, substantially as and for the purpose set forth.

To the above specification of our invention, we have signed our hand, this 20th day of March, A. D. 1868.

CHARLES I. WILMANS,
WESLEY J. WOLFE.

Witnesses:
J. C. SCOTT,
G. D. SLANKER.